United States Patent
Nakagai et al.

(10) Patent No.: US 9,170,622 B2
(45) Date of Patent: Oct. 27, 2015

(54) SYSTEM FOR SUPPLY OF POWER SOURCE CURRENT, CONNECTOR AND METHOD OF SUPPLYING POWER SOURCE CURRENT

(75) Inventors: Miki Nakagai, Kawasaki (JP); Toshihiro Miyamoto, Machida (JP); Norio Nagahama, Tokorozawa (JP)

(73) Assignee: FUJITSU LIMITED, Kawasaki (JP)

( * ) Notice: Subject to any disclaimer, the term of this patent is extended or adjusted under 35 U.S.C. 154(b) by 682 days.

(21) Appl. No.: 13/558,410

(22) Filed: Jul. 26, 2012

(65) Prior Publication Data
US 2013/0033107 A1 Feb. 7, 2013

(30) Foreign Application Priority Data

Aug. 1, 2011 (JP) .................................. 2011-168618
Jun. 14, 2012 (JP) .................................. 2012-135233

(51) Int. Cl.
*G06F 1/26* (2006.01)

(52) U.S. Cl.
CPC .............. *G06F 1/266* (2013.01); *Y10T 307/461* (2015.04)

(58) Field of Classification Search
CPC ..... G06F 1/266; G06F 1/3203; G06F 1/3253; G06F 13/4291; G06F 2213/0042; Y02B 60/1235
USPC ................. 307/64–66, 38; 710/105, 305, 313
See application file for complete search history.

(56) References Cited

U.S. PATENT DOCUMENTS

| 7,631,200 | B2 | 12/2009 | Niwa et al. | |
|---|---|---|---|---|
| 2005/0268131 | A1* | 12/2005 | Matsunobu | 713/323 |
| 2006/0047983 | A1* | 3/2006 | Aleyraz et al. | 713/300 |
| 2006/0117195 | A1 | 6/2006 | Niwa et al. | |
| 2009/0063717 | A1* | 3/2009 | Bohm et al. | 710/8 |
| 2009/0079264 | A1 | 3/2009 | Minami | |

FOREIGN PATENT DOCUMENTS

| JP | 2009-075902 A | 4/2009 |
|---|---|---|
| WO | 2005/022369 A1 | 3/2005 |

* cited by examiner

*Primary Examiner* — Jared Fureman
*Assistant Examiner* — James P Evans
(74) *Attorney, Agent, or Firm* — Maschoff Brennan

(57) ABSTRACT

A system for supply of power source currents, the system includes: a power source input terminal configured to be supplied with a power source current; a plurality of power source output terminals, coupled to the power source input terminal in parallel, configured to output a power source current; a protecting circuit configured to protect a supply of a excessive power source current to the power source input terminal; a plurality of data signal terminals each corresponding to one of the plurality of power source output terminals; and a connector coupled to at least one pair of one of the plurality of power source output terminals and one of the plurality of data signal terminals.

10 Claims, 11 Drawing Sheets

FIG. 6

- LENGTH
- DESCRIPTOR TYPE
- USB VERSION NUMBER
- DEVICE CLASS ~ 61
- DEVICE SUBCLASS
- DEVICE PROTOCOL
- MAX PACKET SIZE (EP0)
- VENDOR ID ~ 62
- PRODUCT ID ~ 63
- DEVICE VERSION NUMBER
- MANUFACTURER
- STRING INDEX (PRODUCT) ~ 64
- STRING INDEX (SERIAL NUMBER)
- CONFIGURATION NUMBER

//)

SYSTEM FOR SUPPLY OF POWER SOURCE CURRENT, CONNECTOR AND METHOD OF SUPPLYING POWER SOURCE CURRENT

CROSS-REFERENCE TO RELATED APPLICATION(S)

This application is based upon and claims the benefit of priority of the prior Japanese Patent Application No. 2011-168618, filed on Aug. 1, 2011, and the prior Japanese Patent Application No. 2012-135233, filed on Jun. 14, 2012, the entire contents of which are incorporated herein by reference.

FIELD

The embodiment discussed herein is related to a technology for supplying power source currents.

BACKGROUND

An apparatus coupled via an interface according to a standard related to supply of power source currents is supplied with a power source current. As being connected via the interface according to the standard possibly without an embedded battery, an AC power source or the like, the apparatus may be downsized or be trimmed weight. A personal computer (PC) or something may be provided with a plurality of interfaces according to the standard related to supply of power source currents. A system for supplying the PC with a power source current via the interface may be installed on the PC.

A related art is disclosed in Japanese Laid-open Patent Publication No. 2009-75902 and International Publication Pamphlet No. WO 2005/022369.

SUMMARY

According to one aspect of the embodiments, a system for supply of power source currents, the system includes: a power source input terminal configured to be supplied with a power source current; a plurality of power source output terminals, coupled to the power source input terminal in parallel, configured to output a power source current; a protecting circuit configured to protect a supply of a excessive power source current to the power source input terminal; a plurality of data signal terminals each corresponding to one of the plurality of power source output terminals; and a connector coupled to at least one pair of one of the plurality of power source output terminals and one of the plurality of data signal terminals.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 depicts an exemplary descriptor information.

DESCRIPTION OF EMBODIMENT

An interface may be referred as a "port". A system for supply of a power source current via a port may be installed on a PC. The port includes at least one power source output terminal for supplying a power source current, and at least one data signal terminal for transmitting and receiving a data signal.

Figure 1:
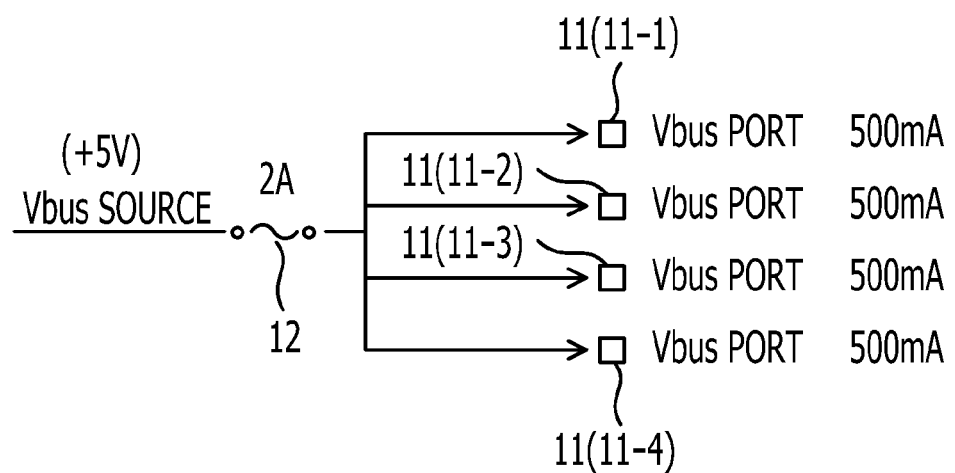
FIG. 1 depicts an exemplary method for supplying power source current.

FIG. 1 depicts an exemplary method for supplying power source current. The method depicted in FIG. 1 may be of a system for controlling supply of power source currents and sensing an excessive current for a plurality of ports, e.g., a gang system. FIG. 1 depicts four Vbus ports 11 (11-1 through 11-4) coupled to a power source circuit "Vbus Source" via a fuse 12. The ports 11 are each supplied with a power source current by the power source circuit via the fuse 12. For example, the fuse 12 senses an excessive current exceeding 500 mA and cuts the current supply off "500 mA" illustrated in FIG. 1 may correspond to a rated current per one port, for example, maximum current.

In the gang system, devices coupled to the respective ports notify the current supply side, e.g., the PC side of a desirable current value, and the PC side increases a current to be supplied based on the notified current value. In the gang system, the maximum of the power source current to be supplied to each of the ports is set according to the devices coupled to the ports and the number of the devices.

The devices coupled to the ports may include a device which desires a current larger than the rated current of the relevant port (big eater), e.g., a coffee warmer or an electric kotatsu heater.

Figure 2:
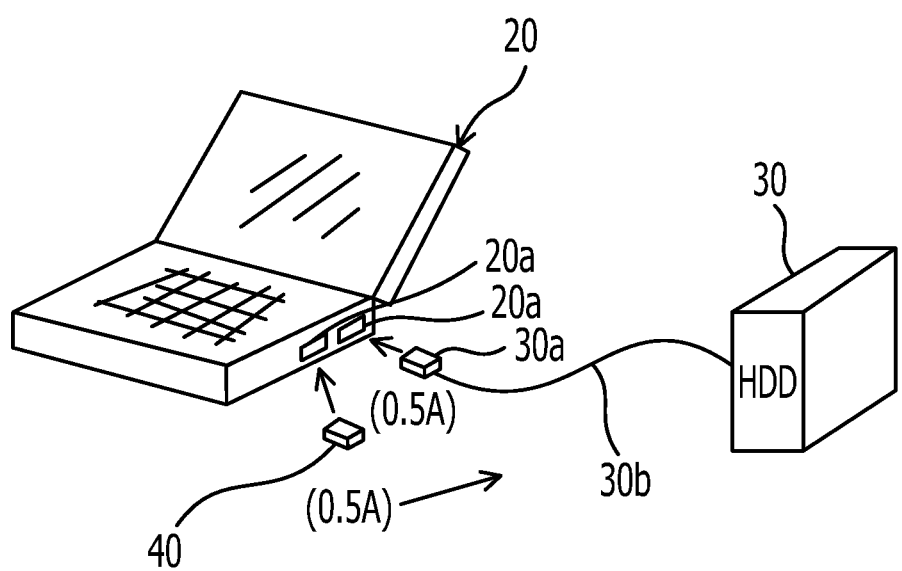
FIG. 2 depicts an exemplary system for supply of power source current.

FIG. 2 depicts an exemplary system for supply of power source current. The system for supply of power source currents is applied to a notebook personal computer (PC) 20. The PC 20 is provided with two ports 20a which are each supplied with a power source current on a side of the body. The system for supply of power source currents includes a dummy connector 40 to be capable of being coupled to the port 20a. The port 20a may be a USB (Universal Serial Bus) connector. A USB connector includes a female connector and a male connector to be coupled to the female connector. For distinction, the female connector may be referred as a "USB receptacle" or "USB socket" and the male connector may be referred as a "USB plug". The PC 20 is provided with a "USB socket" as the USB connector 20a. The USB standard may be USB 2.0. A voltage specified according to the USB standard may be five volts.

A hard disk device (HDD) 30 includes a USB cable 30b having a USB plug 30a, and is coupled to the USB socket 20a via the USB cable 30b. The hard disk device 30 desires a current larger than the rated (maximum) current as large as 0.5 amps specified according to the USB standard, e.g., one amp. The dummy connector 40 enables a supply of a power source current as large as one amp to the hard disk device 30.

Figure 3:
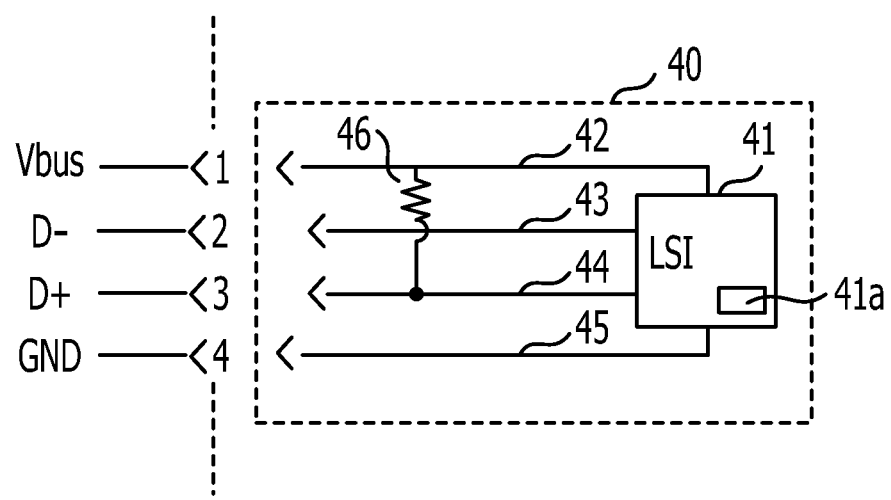
FIG. 3 depicts an exemplary circuit of a dummy connector.

FIG. 3 depicts an exemplary circuit of a dummy connector. Numbers 1-4 illustrated in FIG. 3 indicate pin numbers allotted to respective pins of a USB plug (not depicted) provided in the dummy connector 40. Vbus, GND, D− (−DATA) and D+ (+DATA) indicate a kind of signal which flows through a signal line. The signals Vbus and GND may indicate a supplied power source current. The signals D− and D+ form a differential signal to be used for data communication.

A pin of the USB plug (not depicted) in the dummy connector 40, which has the pin number 1, is coupled to a power line 42. Pins, which have the pin numbers 2, 3 and 4 respectively, are coupled to signal lines 43, 44 and a GND line 45, respectively. The signals Vbus, D−, D+ and GND flow through the power line 42, the signal lines 43, 44 and the GND line 45, respectively. The dummy connector 40 includes an LSI (Large Scale Integration) circuit 41 coupled to the power line 42, the signal lines 43, 44 and the GND line.

As the signal line 44 is coupled to the power line 42 via a resistor 46, the signal D+ is pulled up. According to the USB standard, a host (to be coupled to a device) may recognize the dummy connector 40 as, e.g., a full speed device of the USB standard based on the pull-up.

Figure 4:
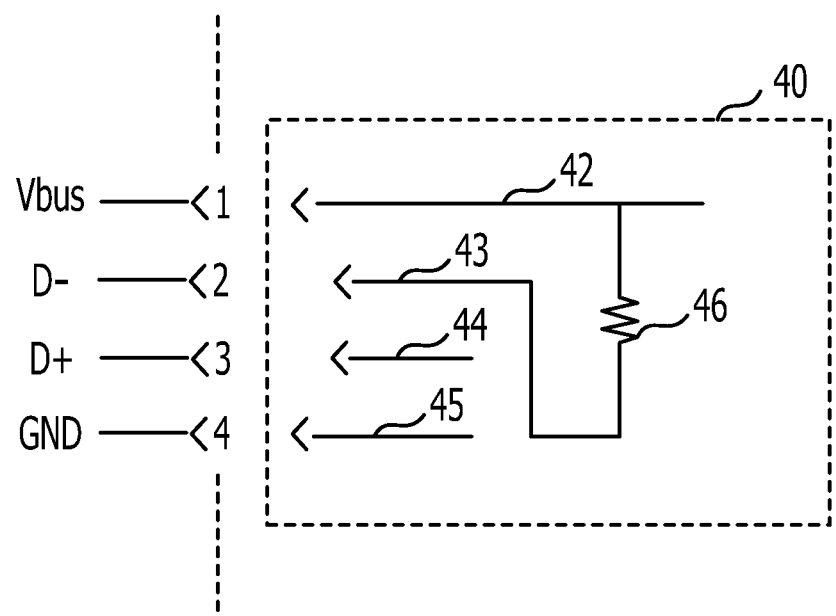
FIG. 4 depicts an exemplary circuit of a dummy connector.

The LSI 41 includes a non-volatile memory 41a which stores descriptor information including information for an identification by a destination coupled to the dummy connector 40, for example, the PC 20 or consumed electric power. The descriptor information is transmitted to the host. As the host recognizes the dummy connector 40 as a full speed device based on the pull-up of the signal line D+, the LSI 41 may be omitted. The host may recognize the dummy connector 40 as a full speed device based on simply the presence of the pull-up of the signal line D+. FIG. 4 depicts an exemplary circuit of a dummy connector. The dummy connector 40 depicted in FIG. 4 may lack the LSI 41. The signal line 43 may be coupled to the power line 42 via the resistor 46 so that the signal D− is pulled up. The host may recognize the dummy connector 40 as a low speed device based on the pull-up of the signal D−.

Figure 5:
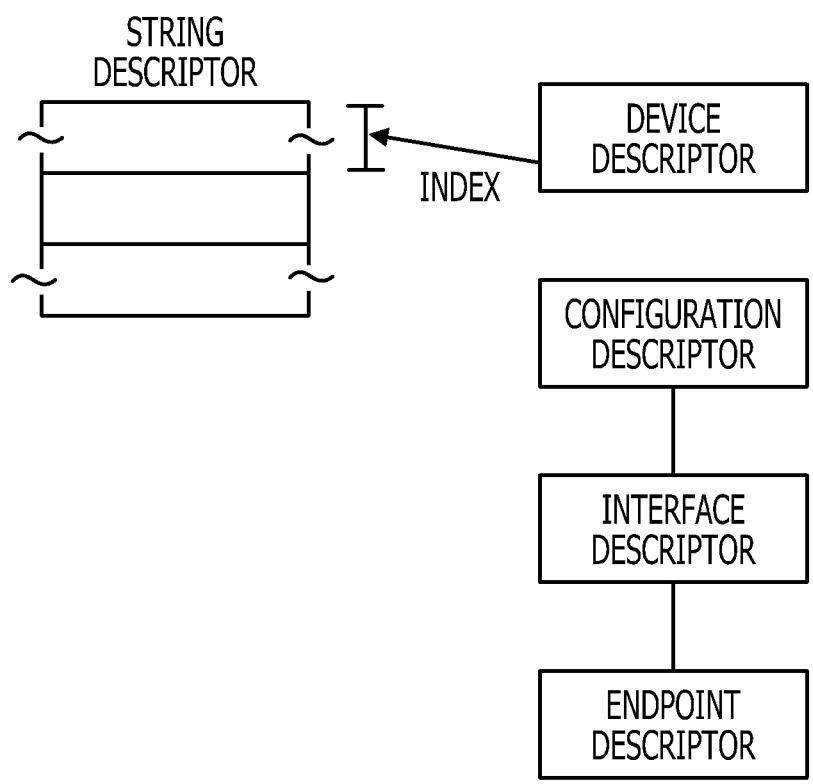
FIG. 5 depicts an exemplary descriptor information.

FIGS. 5 and 6 depict an exemplary descriptor information. The descriptor information depicted in FIG. 5 includes a device descriptor, a configuration descriptor, an interface descriptor, an endpoint descriptor and a string descriptor.

An explanatory description of the device or an interface or a serial number of the device may be set to the string descriptor. The string descriptor may be prepared for every item of what is explanatorily described.

As depicted in FIG. 6, information about various kinds of properties is written in the device descriptor. A device class 61 indicates a class of the device such as a USB hub, a keyboard, a mouse, etc. Device control may be shared according to the USB standard so that devices belonging to a same class use a same request packet. A vendor ID 62 and a product ID 63 may be used in order to identify a device driver that the host, e.g., the PC 20 side depicted in FIG. 2 loads. A device driver where the device control has been shared, e.g., an HID (Human Interface Device), a mass storage device or the like may identify the device driver based on the device class 61. A string index (product) 64 specifies an index for the string descriptor that an explanation about the device and the like is written.

The number of interfaces, consumed electric power of the device or a method for supplying the device with a power source current may be written in the configuration descriptor. An interface specification may be written in the interface descriptor. The number of endpoints may be written as the interface specification. The endpoint indicates a buffer which corresponds to a logical communication path which couples the device to the host. For each of the endpoints, an end point number, a transfer direction, a transfer method or largest packet size may be defined. An endpoint according to what is transferred is used for a data transfer between the host and the device. What is defined may be described in the endpoint descriptor for each of the endpoints.

The device coupled to the host (PC 20) sends a descriptor in response to a request from the host. The descriptor information may be stored in the non-volatile memory 41a in the LSI 41 of the dummy connector 40 depicted in FIG. 3.

A class code indicating "dummy connector" may be written in the device class 61 in the device descriptor of the descriptor information. An ID of a vendor who provides the dummy connector 40 may be written in the vendor ID 62 in the device descriptor, a product type of the dummy connector 40 may be written in the product ID 63, and an index of a string descriptor in which an explanation of the dummy connector 40 is written may be written in the string index (product) 64. The string descriptor in which the explanation of the dummy connector 40 is written may be provided as part of the descriptor information.

In the configuration descriptor, a value indicating a desired power source current approximately as large as 0.5 amps (=2.5=5×0.5) may be written as a value of the consumed electric power of the device.

For example, as illustrated in FIG. 2, the PC 20 coupled to the dummy connector 40 performs an enumeration for collecting the descriptor information including the device, configuration, and string descriptors described above, and identifies the dummy connector 40. Based on the results from the enumeration, the PC 20 may supply the power source current requested by the dummy connector 40.

The hard disk device 30 transfers the descriptor information for the enumeration based on the request from the host, e.g., the PC 20. The host identifies the hard disk device 30 based on the device descriptor in the descriptor information transferred from the hard disk device 30. The host may supply a power source current which is requested by the hard disk device 30 based on the configuration descriptor. The hard disk device 30 may secure a power source current as large as 0.5 amps, for example.

Although the dummy connector 40 desires a power source current for operation thereof, the dummy connector 40 does not consume much electric power. Therefore, it is rendered that the USB socket 20a is not used for supply of a power source current. The dummy connector 40 may request a certain power source current, for example, a larger power source current than a power source current for the operation thereof so as to secure a power supply for another electronic apparatus that desires a power source current that is larger than a rated current of one USB port.

The system for supply of power source currents applied to the PC 20 depicted in FIG. 2 may employ a gang system in which supply of power source currents is controlled or an excessive current is sensed for two of the USB sockets 20a. The PC 20 where the dummy connector 40 is coupled to one of the sockets 20a supplies a current corresponding to a device coupled to the other USB socket 20a (called "USB device" hereafter) and a current secured by the dummy connector 40. As the dummy connector 40 does not consume much electric power, the USB device coupled to the other USB socket 20a may use most of the currents supplied by the PC 20. The hard disk device 30 depicted in FIG. 2, e.g., may receive a current as large as 0.5 amps and a current that is obtained by subtracting the current consumed by the dummy connector 40 from the rated current of one port coupled to the dummy connector 40. If the power source currents are supplied for two of the USB sockets 20a according to the gang system, a maximum current approximately as large as one amp may be supplied via one of the USB sockets 20a based on the dummy connector 40.

In the host, a device driver corresponding to the device may be loaded from the vendor ID 62 or product ID 63 in the device descriptor. A device driver identified according to the device class 61 may be loaded as desired. If the hard disk device 30 is coupled to the USB socket 20a, a device driver for exclusive use corresponding to the hard disk device 30 may be loaded. Whether the dummy connector 40 is coupled to the host is detected and the detected result is notified to a user. As notifying the user of the detected result, the host may warn the user to couple the dummy connector 40 to the host based on the detected result indicating that the dummy connector 40 is not coupled to the host. If a device driver according to a class standard of the hard disk device 30 is loaded, the above functions may be installed by means of a filter driver attached to the device driver.

Figure 7:
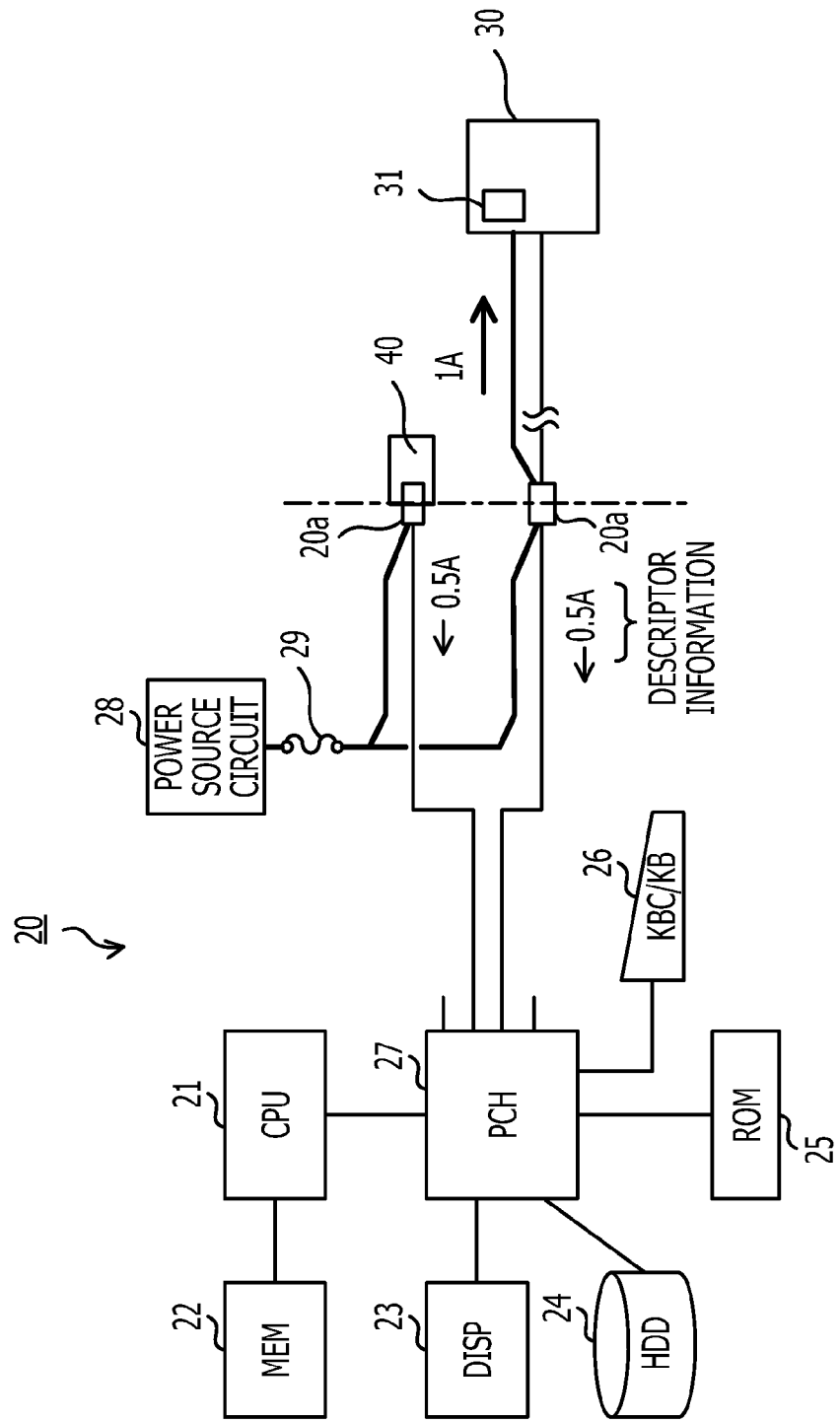
FIG. 7 depicts an exemplary personal computer.

FIG. 7 depicts an exemplary personal computer. The personal computer PC 20 depicted in FIG. 7 includes a CPU (Central Processing Unit) 21, a memory (e.g., memory module) 22, a display monitor (Disp) 23, a hard disk device 24, a ROM (Read Only Memory) 25, an input device 26, a PCH (Platform Controller Hub) 27, a power source circuit 28 and a fuse 29. The input device 26 includes a keyboard (KB) and a keyboard controller (KBC). The system for supply of power source currents may be performed, e.g., by the CPU 21, the memory 22, the hard disk device 24, the ROM 25, the PCH 27, the power source circuit 28, the fuse 29, the two dummy connectors 20a and the dummy connector 40.

Data such as BIOS (Basic Input/Output System) codes is stored in the ROM 25. Programs such as an OS (Operating System) and various kinds of application programs and various kinds of data are stored in the hard disk device 24. The CPU 21 executes the BIOS codes read from the ROM 25 via the PCH 27. The CPU 21 reads the OS from the hard disk device 24 via the PCH 27 and executes the OS based on the execution of the BIOS codes. The memory 22 is used when the CPU 21 executes the BIOS codes and the OS.

The PCH 27 interfaces with peripheral devices including the USB device such as the hard disk device 24. The PCH 27 may include functions for optional bus interface (not illustrated) of PCI express, serial ATA (AT Attachment), USB, LAN and graphics. The PCH 27 may be coupled to the CPU 21, the ROM 25, the hard disk device 24, the display monitor 23, the input device 26, the respective USB sockets 20a, the power source circuit 28, etc. The CPU 21 may display an image on the display monitor 23, perceive the operation performed by the user on the input device 26 via the PCH 27 or control the supply of the power source current via the power source circuit 28.

The power source circuit 28 supplies the respective USB sockets 20a with power source currents via the fuse 29. The pin of the pin number one of each of the USB sockets 20a, for example, the signal line which outputs the signal Vbus may be coupled to the fuse 29 in parallel. Therefore, the power source circuit 28 may be a power source which generates a voltage of five volts according to the USB standard and supplies power source currents with various values desired by the USB device coupled to the respective USB sockets 20a. The power source circuit 28 may have a known constitution.

The fuse 29 may sense or cut off an excessive current coming from the power source circuit 28. The fuse 29 may include, e.g., a PolySwitch. The PolySwitch may be a polymer-based PTC (Positive Temperature Coefficient) thermistor. As temperature rises and a resistance value increases due to an excessive current or overheating inside the PolySwitch element, the quantity of the supplied current may be limited. As the heat-based change of the resistance value is reversible, a PTC thermistor may be used as the fuse 29.

The PCH 27 watches voltage changes on the signals D+ and D− coming from the respective USB sockets 20a, for example. If the voltage of the signal D+ or D− coming from one of the USB sockets 20a is not lower than a certain value, the PCH 27 notifies the CPU 21 of the fact that a coupling event according to the USB standard occurs. The CPU 21 makes an enumeration upon receiving the notice. The CPU 21 requests the USB device using the signals D+ and D− to transmit a device descriptor via the PCH 27 in the enumeration. Upon obtaining a requested device descriptor, the CPU 21 identifies a USB device coupled to the USB socket 20a on which the voltage of the signal D+ or D− is not lower than the particular value and allots an address to the USB device. The CPU 21 obtains the other descriptors including the configuration descriptor from the USB device and perceives a constitution of the USB device. Upon perceiving the constitution, the USB device coupled to the USB socket 20a becomes usable, and the enumeration completes. The power source circuit 28 controls the quantity of the supplied power source current according to the current value specified by the enumeration. The USB device coupled to the USB socket 20a may receive a specified power source current under the control of the quantity of the supplied power source current.

The ports each may be supplied with a current for an emulation, for example, a current as large as 100 mA according to the USB standard. The CPU 21 may make the power source circuit 28 supply a power source current as large as 100 mA per one USB socket 20a even without perceiving a USB device coupled to the USB socket 20a.

The hard disk device 30 and the dummy connector 40 may specify a power source current as large as 0.5 amps. The power source circuit 28 of the PC 20 where the hard disk device 30 and the dummy connector 40 are coupled to the USB socket 20a may supply a power source current approximately as large as one amp. Thus, the hard disk device 30 may use a power source current as large as one amp. The power source current for the hard disk device 30 may be specified by the CPU 21 enumerating the descriptor information stored in a non-volatile memory 31 of the hard disk device 30.

The dummy connector 40 having a simple constitution depicted in FIG. 3 or 4 may be made at low cost. The quantity of the power source current supplied from the other USB socket 20a which uses the dummy connector 40 may be adjusted at low cost.

The quantity of the power source current specified by the dummy connector 40 may be of any value. The quantity of the power source current to be specified may be changed. If the PC 20 has, e.g., three or more USB sockets 20a, two or more dummy connectors 40 may be coupled to the USB sockets 20a. A power source current may be supplied to the USB device from another USB socket 20a according to the quantity of the power source current specified by the dummy connector 40.

The power source current corresponding to the current specified by the dummy connector 40 supplied by the PC 20 is supplied based on the connection between the dummy connector 40 and the USB socket 20a. When the dummy connector 40 is coupled to the USB socket 20a, physical coupling to another USB device is reduced and a current exceeding the rate current is supplied to the USB device coupled to the USB socket 20a. When the current specified by the dummy connector 40 is supplied, the connection with the dummy connector 40 may reduce a supply of an excessive current to the USB device coupled to the USB socket.

Figure 8:
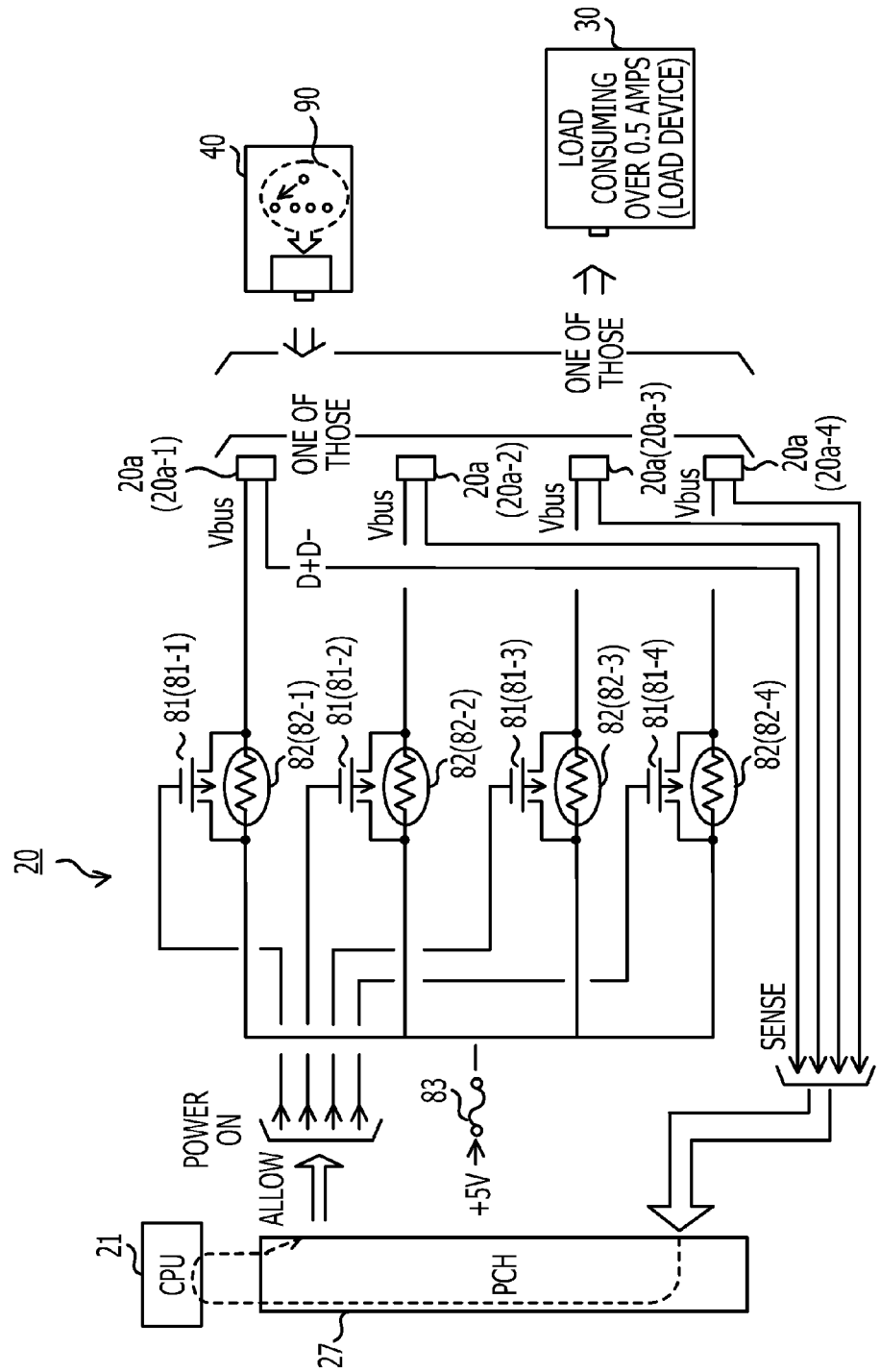
FIG. 8 depicts an exemplary personal computer.

FIG. 8 depicts an exemplary personal computer. The personal computer depicted in FIG. 8 may be similar to the personal computer depicted in FIG. 7. The memory 22, the display monitor 23, the hard disk device 24, the ROM 25, the input device 26 and the power source circuit 28 depicted in FIG. 7 may be omitted in FIG. 8.

The PC 20 depicted in FIG. 8 includes four USB sockets 20a (20a-1 through 20a-4). A signal line coupled to a pin of the pin number 1 in each of the USB sockets 20a, e.g., a signal line to which a signal Vbus corresponding to a power source current is supplied is coupled to an end of each of resistors 82 (82-1 through 82-4). The other end of each of the resistors 82 is coupled to an end of a fuse 83. The other end of the fuse 83 is coupled to a power source circuit 28 which is not depicted. The fuse 83 may be used for sensing or cutting off an excessive current similarly to the fuse 83. The fuse 83 may be, e.g., a PolySwitch (PTC thermistor). The number of the USB sockets 20a of the fuse 83, for example, a value of the power source current to be cut off may differ from that of the fuse 29.

Two ends of each of the resistors 82 are each coupled to a drain or source of each of P-channel FETs (Field Effect Transistors) 81 (81-1 through 81-4). Gates of the respective FETs 81 are coupled to a PCH 27. The CPU 21 controls a turning-on and a turning-off of the respective FETs 81 via the PCH 27. According to control of the turning-on and turning-off of the respective FETs 81, the CPU 21 chooses one of the USB sockets 20a that a power source current is supplied with. An output signal from the PCH 27 to the gate of each of the FETs 81 may be referred as "supply enabling signal". If the supply enabling signal is at a low voltage level and a high voltage level, the FETs 81 are each turned on and off, respectively.

The CPU 21 may choose one of the USB sockets 20a that the power source current is supplied with. As the USB socket 20a that the power source current is supplied with is chosen, the USB socket 20a that supplies the current specified by the dummy connector 40 may be limited. If the current specified by the dummy connector 40 is supplied, a current supply to the USB socket 20a coupled to a USB device with which an excessive current is supplied may be reduced.

The fuse 83 may cut off excessive currents flowing to the four USB sockets 20a. If one of the USB sockets 20a that the power source current is supplied with is chosen, an excessive current may flow to a certain USB socket 20a. The excessive current supplied to the USB socket 20a may be reduced owing to the resistor 82.

The resistors 82 each may be, e.g., a PTC thermistor. In the PTC thermistor, a resistance value may increase owing to self heat generation based on the flowing current and the flow of the current becomes resistant. Thus, the resistor 82 may be a current limiting element which reduces supply of an excessive current to the coupled USB socket 20a.

The user may choose one of the USB sockets 20a that the power source current is supplied with. The dummy connector 40 may be provided with a choosing switch 90 for choosing one of the USB sockets 20a that the power source current is supplied with.

Figure 9:
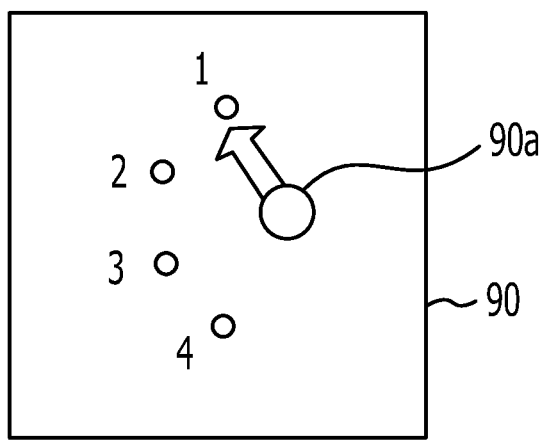
FIG. 9 depicts an exemplary selecting switch.
Figure 10:
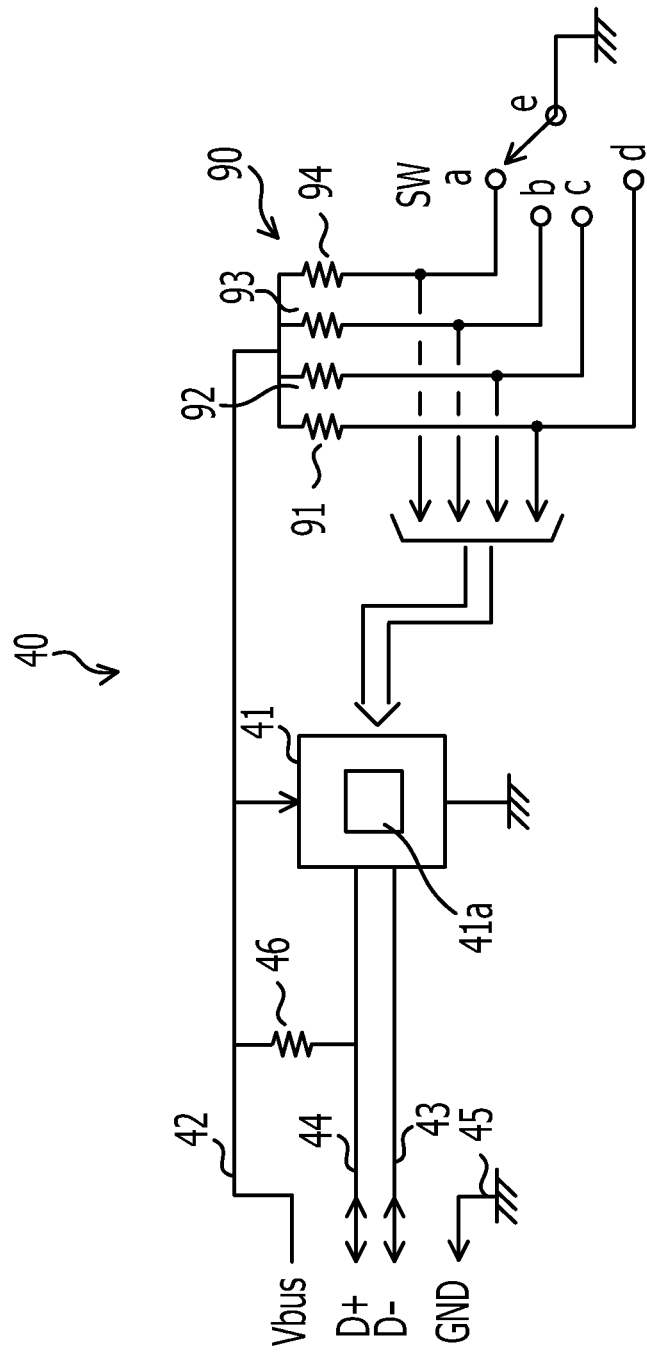
FIG. 10 depicts an exemplary dummy connector.

FIG. 9 depicts an exemplary choosing switch. The dummy connector may be provided with the choosing switch depicted in FIG. 9. FIG. 10 depicts an exemplary dummy connector. Numerals 1-4 are set to a knob 90a of the choosing switch 90. One of the numerals 1-4 may be chosen by the knob 90a. In FIG. 9, the numeral 1 may be chosen by the knob 90a. The numerals 1-4 may each correspond to one of the four USB sockets 20a. The numeral 1, e.g., may correspond to the USB socket 20a-1. The numerals 2, 3 and 4 may correspond to the USB sockets 20a-2, 20a-3 and 20a-4, respectively.

The dummy connector 40 depicted in FIG. 10 includes the LSI 41. As the signal line 44 used for input and output of the signal D+ is coupled to the power line 42 via the resistor 46, the signal D+ is pulled up. The choosing switch 90 includes a through e contacts. One of the a through d contacts is coupled to the e contact according to a round position of the knob 90a, e.g., the numeral indicated by the knob 90a. The a through d contacts indicate the contacts corresponding to the numerals "1" through "4" depicted in FIG. 9.

Resistors 91-94 are each provided between the power line 42 that the power source current signal Vbus is supplied with and the a through d contacts, respectively, and the e contact is grounded. Thus, the voltage at a contact coupled to the e contact falls to the ground level. One of the a through d contacts coupled to the e contact is identified from the voltage values on the a through d contacts. The LSI 41 identifies the contact coupled to the e contact by monitoring the input voltage on each of the a through d contacts. The LSI 41 informs the PC 20 of information which specify the USB socket 20a corresponding to the identified node, for example, the "USB port number" using the signals D+ and D− provided to the signal lines 44 and 43, respectively. The numerals "1" though "4" following "20a-" depicted in FIG. 8 may each indicate the USB port number. The numerals "1" through "4" depicted in FIG. 9 each indicate the USB port number.

The dummy connector 40 is coupled to the USB socket 20a. The CPU 21 of the PC 20 performs an enumeration and loads a device driver for the dummy connector 40. The CPU 21 controls switching operations of the respective FETs 81 according to the USB port number informed by the dummy connector 40 from the loaded device driver after the enumeration.

The USB device coupled to the USB socket 20a may differ from a USB device which makes a reply according to the USB protocol such as a hard disk device 30, e.g., a USB device recognized by the CPU 21.

Unless the CPU recognizes the USB device coupled to the USB socket 20a, the power source circuit 28 turns all the FETs 81 on as controlled by the CPU 21 so as to supply a power source current as large as 100 mA per one USB socket 20a. The CPU 21 may carry out emulation regardless of which USB socket 20a the USB device is coupled to.

Upon recognizing the USB device coupled to the USB socket 20a, the CPU 21 carries out an emulation and makes the power source circuit 28 supply a power source current specified by the USB device.

If the recognized USB device differs from the dummy connector 40, an on-state of all the FETs 81 may be maintained. If the dummy connector 40 is not recognized, the CPU 21 keeps all the FETs 81 on and adjusts a quantity of the current supplied by the power source circuit 28 depending upon connection or termination of connection of the recognized USB device. The CPU 21 may recognize the termination of connection of the USB device based on the notice indicating that the USB device is removed from the USB socket 20a or on processing of an instruction by the input device 26 for removing the USB device.

If the recognized USB device is the dummy connector 40, the power source circuit 28 further supplies a power source current specified by the dummy connector 40 as controlled by the CPU 21. The FET 81 of the USB socket 20a coupled to the dummy connector 40 and the FET 81 of the USB socket 20a that the USB port number notified by the dummy connector 40 is allotted to may be turned on, and the rest of the FETs 81 may be turned off. The CPU 21 limits the USB socket 20a that the power source current is supplied with. Owing to the limitation, a current excessively supplied to a USB device based on a connection or new connection between the USB device and the other not-identified USB socket 20a may be reduced.

If the dummy connector 40 finishes being connected, the power source circuit 28 supplies a power source current as large as 100 mA per one USB socket 20a as controlled by the CPU 21, and the FET 81 of the USB socket 20a that the USB port number notified by the dummy connector 40 is allotted to is turned off. The power supply to the USB socket 20a specified by the user using the choosing switch 90 finishes based on termination of connection of the dummy connector 40. The termination of the connection of the dummy connector 40 may be considered as instructions to stop supplying the USB socket 20a specified by the user with a current.

The CPU 21 stops supplying the USB socket 20a specified by the user with a current, and turns the FET 81 at a off-state on. The FETs 81 which differ from the FET 81 of the USB socket 20a specified by the user are turned on. A USB device may be coupled to one of the USB sockets 20a not specified by the user. The FET 81 of the USB socket 20a specified by the user may be turned on after a particular period of time elapses after being turned off, for example. The supply of the power source current may be stopped until a USB device which is not recognized is removed from the USB socket 20a.

If the dummy connector 40 is coupled, the FET 81 of the USB socket 20a that the dummy connector 40 is coupled to and the FET 81 of the USB socket 20a that the USB port number notified by the dummy connector 40 is allotted to, e.g., of a "target port" may turn on. For example, the FET 81 to be tuned on may be chosen in consideration of a USB socket 20a whose connection is recognized before the dummy connector is coupled. For example, the supply of power supply current to a USB device coupled to the USB socket 20a before the dummy connector 40 is coupled may maintain regardless of whether the USB device is coupled to the target port. Thus, a USB device having been coupled may be used after the dummy connector 40 is coupled. The supply of power supply current to a USB device not coupled to may be maintained when recognizing that the USB device is coupled to the target port. This is because a USB device not coupled to the target port is not likely to be supplied with an excessive current because the USB device coupled to the target port consumes a current.

Figure 11:
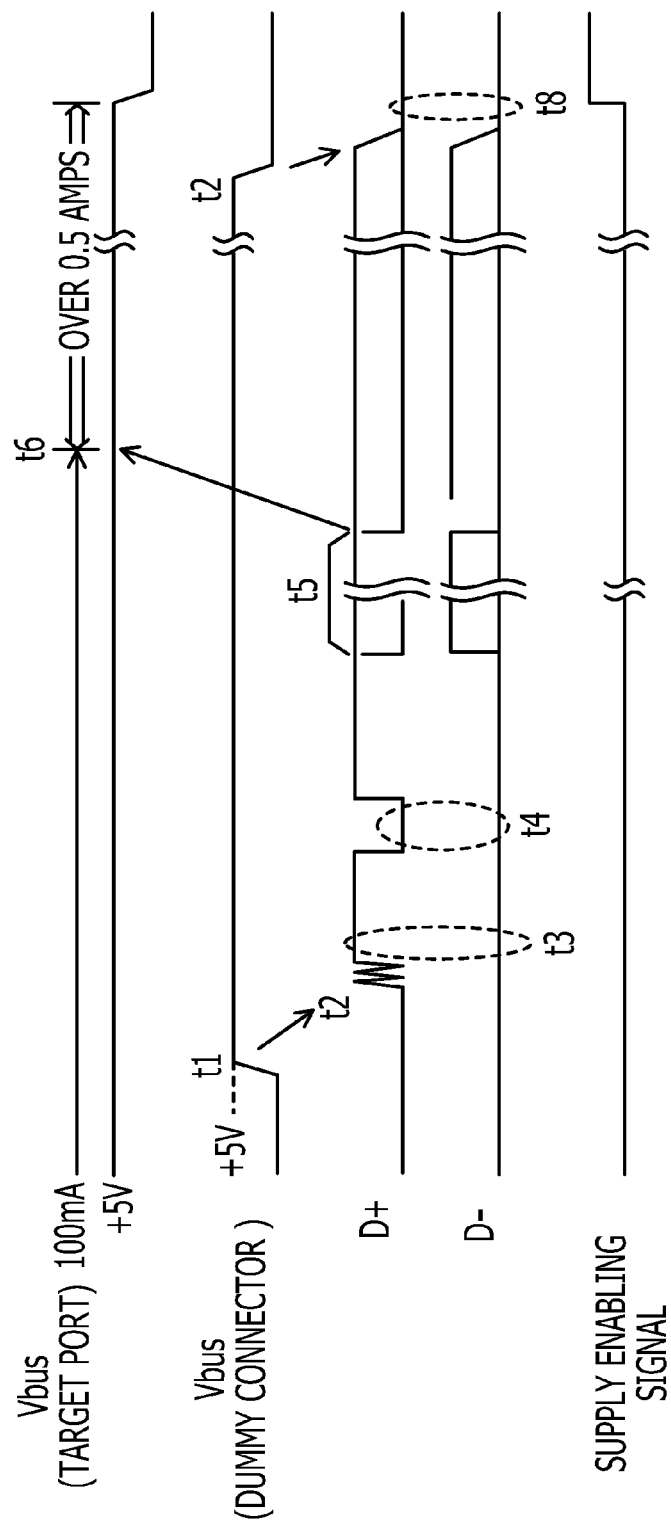
FIG. 11 depicts an exemplary signal related to a USB socket.

FIG. 11 depicts an exemplary signal related to a USB socket. The USB socket may be coupled to the target port and the dummy connector. FIG. 11 depicts voltage and current waveforms of the signal Vbus to be output, e.g., via the USB socket 20a and a voltage of the supply enabling signal to be output to the FET 81 as signals related to the USB socket 20a specified by the user, e.g., the "target port" depicted in FIG. 11. FIG. 11 depicts a voltage waveform of the signal Vbus to be input to the dummy connector 40 and voltage waveforms of the respective signals D+ and D− as the signals related to the USB socket 20a coupled to the dummy connector 40.

In FIG. 11, the dummy connector 40 may be coupled to the USB socket 20a after a USB device is coupled to the target port. After the USB device is coupled to the target port, the dummy connector 40 is coupled to the USB socket 20a at time t1 and the voltage of the signal Vbus supplied via the coupled USB socket 20a rises to five volts. As the voltage changes, the voltage of the signal D+ pulled up by the resistor 46 rises after time t2. The rise of the voltage is sensed by the PCH 27 and is then recognized by the CPU 21 of the PC 20 at time t3.

Upon recognizing the rise of the voltage, the CPU 21 of the PC 20 instructs the PCH 27 to transmit a bus resetting signal and maintains the voltages of the signals D+ and D− on the dummy connector 40 at a low level for a period of time t4 in order to exclude an uncertain state in time of device connection. The LSI 41 of the dummy connector 40 carries out an initializing (resetting) process. The CPU 21 of the PC 20 instructs the PCH 27 to perform an enumeration in a period of time t5 and collects descriptor information, e.g., a descriptor such as the device descriptor or configuration descriptor from the dummy connector 40.

Upon collecting the descriptor information from the dummy connector 40, the CPU 21 of the PC 20 instructs the power source circuit 28 to increase the supplied quantity of the power source current depending upon the power source current specified by the dummy connector 40. The target port is able to consume a power source current over 0.5 amps based on the signal Vbus after time t6. For example, if the USB device coupled to the target port is the hard disk device 30, the hard disk device 30 draws a power source current approximately as large as one amp. Under the control of the CPU 21, the supply enabling signals provided to the FETs 81 of the other USB sockets 20a other than the USB sockets 20a coupled to the target port and the dummy connector 40 rises to a high level, and connection of the USB devices to the other USB sockets 20a may be invalidated.

If the dummy connector 40 is disconnected from the USB port 20a at time t7, the voltage on the signal line 41 of on the dummy connector 40 falls to a low level. As the voltage falls, the LSI 41 stops operation and the voltage of the signal D+ falls as well. Based on the notice from the PCH 27, the CPU 21 of the PC 20 recognizes the termination of connection of the dummy connector 40 at time t8. The CPU 21 raises the supply enabling signal provided to the FET 81 of the target port to a high level and stops the supply of power source current from the target port. The voltage level of the signal Vbus supplied from the target port falls to a low level. The CPU 21 drops the supply enabling signals provided to the FETs 81 of the other USB sockets 20a other than the USB sockets 20a coupled to the target port and the dummy connector 40 to a low level, and starts to supply the other USB sockets 20a with power source currents.

If the user instructs to disconnect the dummy connector 40 via the input device 26, the process of the instruction by the CPU 21 may be considered as termination of the connection with the dummy connector 40. The termination of the connection with the dummy connector 40 may be recognized regardless of the voltage level of the signal D+.

One or a plurality of the dummy connectors 40 may be coupled to the USB sockets 20a. A significant power source current may be supplied from one USB socket 20a, e.g., the target port by the plurality of dummy connectors 40. The dummy connector 40 may choose one or a plurality of the target ports.

The interface for supplying a power source current may be an interface according to the USB standard, and may be another interface that a power source current can be supplied through. The interface may be applied to a data processing device such as the PC 20, or an electric appliance including an interface that a power source current can be supplied through.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A system for supply of power source current, the system comprising:

a power source input terminal configured to be supplied with a power source current;

a plurality of power source output terminals, coupled to the power source input terminal in parallel, configured to output a power source current;

a protecting circuit configured to protect a supply of an excessive power source current supplied to the power source input terminal;

a plurality of data signal terminals each corresponding to one of the plurality of power source output terminals; and a connector coupled to at least one pair of one of the plurality of power source output terminals and one of the plurality of data signal terminals, wherein the connector is configured to request a power source current larger than an operating power source current of the connector such that at least a portion of the requested power source current is supplied to another apparatus via another power source output terminal of the plurality of power source output terminals.

2. The system according to claim 1, wherein the connector is coupled to the at least one pair in a separable manner.

3. The system according to claim 1, the system further comprising:

a plurality of switches each arranged between the power source input terminal and each of the power source output terminals;

a selecting unit configured to select one of the power source output terminals which outputs the power source current; and a control unit configured to control the plurality of switches.

4. The system according to claim 3, wherein the connector is provided in the selecting unit.

5. The system according to claim 3, wherein the control unit controls the plurality of switches so as to make the power source output terminal, which is coupled to the connector, and the power source output terminal, which is selected by the selecting unit, supply the power source currents.

6. The system according to claim 1, wherein the protecting circuit includes a fuse.

7. A connector comprising:

a power source input terminal configured to be capable of coupling to a power source output terminal which is included in a power source current supply system and outputs a power source current;

a data input-output terminal configured to be capable of coupling to a data signal terminal which is included in the power source current supply system and correspond to the power source output terminal;

a connecting unit configured to couple the data input-output terminal and the power source input terminal, and circuitry configured to request, from the power source current supply system, a power source current larger than an operating power source current of the connector such that at least a portion of the requested power source current is supplied to another apparatus via another power source output terminal of the power source current supply system.

8. The connector according to claim 7, wherein the power source current supply system includes a plurality of power source output terminals and wherein the connector further includes:

a selecting unit configured to select one of the plurality of power source output terminals which outputs the power source current; and a signal input-output unit configured to notify the power source current supply system of a selection result.

9. A method of supplying power source current, the method comprising:

selecting at least one of a pair of one of a plurality of power source output terminals and one of a plurality of data signal terminals each corresponding to one of the plurality of power source output terminals, the plurality of power source output terminals and the plurality of data signal terminals being included in a power source current system which supplies a power source current in unit of the power source output terminal;

coupling a connector to the selected pair;

receiving, from the connector, a request for a power source current larger than an operating power source current of the connector; and supplying the requested power source current so as to supply at least a portion of the requested power source current to another pair other than the selected pair.

10. The method according to claim 9, wherein the connector is coupled to the selected pair in a separable manner.

* * * * *